United States Patent
Hojo et al.

(10) Patent No.: US 9,786,949 B2
(45) Date of Patent: Oct. 10, 2017

(54) COMPOSITE METAL OXIDE, METHOD FOR PRODUCING COMPOSITE METAL OXIDE, AND SODIUM SECONDARY BATTERY

(71) Applicant: Panasonic Intellectual Property Management Co., Ltd., Osaka (JP)

(72) Inventors: Nobuhiko Hojo, Osaka (JP); Ryuichi Natsui, Osaka (JP); Akira Kano, Osaka (JP); Masahisa Fujimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 19 days.

(21) Appl. No.: 14/651,158

(22) PCT Filed: Nov. 21, 2013

(86) PCT No.: PCT/JP2013/006845
§ 371 (c)(1),
(2) Date: Jun. 10, 2015

(87) PCT Pub. No.: WO2014/091687
PCT Pub. Date: Jun. 19, 2014

(65) Prior Publication Data
US 2015/0333363 A1    Nov. 19, 2015

Related U.S. Application Data

(60) Provisional application No. 61/737,620, filed on Dec. 14, 2012.

(51) Int. Cl.
*H01M 4/131* (2010.01)
*H01M 10/054* (2010.01)
(Continued)

(52) U.S. Cl.
CPC ...... *H01M 10/054* (2013.01); *C01G 45/1228* (2013.01); *C01G 49/0027* (2013.01);
(Continued)

(58) Field of Classification Search
None
See application file for complete search history.

(56) References Cited

U.S. PATENT DOCUMENTS

| 2011/0003191 A1 | 1/2011 | Kuze et al. |
| 2011/0003192 A1 | 1/2011 | Kuze et al. |
| 2014/0014873 A1 | 1/2014 | Yabuuchi et al. |

FOREIGN PATENT DOCUMENTS

| CN | 1719639 A | 1/2006 |
| JP | 2004-220898 A | 8/2004 |

(Continued)

OTHER PUBLICATIONS

Yabuuchi, P2-type Nax[Fe½Mn½]O2 made from earth-abundant elements for rechargeable Na batteries, Nature Materials, vol. 11, 2012, pp. 512-517.*

(Continued)

*Primary Examiner* — Cynthia K Walls
(74) *Attorney, Agent, or Firm* — McDermott Will & Emery LLP (57) ABSTRACT

An object of the present invention or a problem to be solved by the present invention is to provide, as a material for use as a positive electrode of a sodium secondary battery, a novel material that allows the resulting battery to have capacity characteristics superior to those of conventional batteries. The composite metal oxide of the present invention has a composition represented by the general formula $Na_xMe_yO_2$, where Me is at least one selected from the group consisting of Fe, Mn, and Ni, x satisfies $0.8 < x \leq 1.0$, and y satisfies $0.95 \leq y < 1.05$, and consists of a P2 structure. The sodium secondary battery of the present invention includes: a positive electrode (13) containing the composite metal oxide of the present invention; a negative electrode (16)

(Continued)

containing a material capable of absorbing and desorbing Na ions; and an electrolyte containing Na ions and anions.

4 Claims, 5 Drawing Sheets

(51) Int. Cl.
    *C01G 49/00*     (2006.01)
    *H01M 4/505*     (2010.01)
    *H01M 4/525*     (2010.01)
    *C01G 45/12*     (2006.01)
    *C01G 53/00*     (2006.01)
    *H01M 4/02*     (2006.01)

(52) U.S. Cl.
    CPC ......... *C01G 49/0072* (2013.01); *C01G 53/42* (2013.01); *H01M 4/131* (2013.01); *H01M 4/505* (2013.01); *H01M 4/525* (2013.01); *C01P 2002/72* (2013.01); *C01P 2002/76* (2013.01); *C01P 2006/40* (2013.01); *H01M 2004/028* (2013.01); *Y02P 20/133* (2015.11)

(56) References Cited

FOREIGN PATENT DOCUMENTS

| JP | 2010-129509 A | 6/2010 |
|---|---|---|
| JP | 2012-201588 A | 10/2012 |
| WO | 2009-099061 A1 | 8/2009 |
| WO | 2009-099068 A1 | 8/2009 |
| WO | 2012-060295 A1 | 5/2012 |

OTHER PUBLICATIONS

Yabuuchi, N., et al.: "P2-type Nax[Fe½Mn½]O2 made from earth-abundant elements for rechargeable Na batteries", Nature Materials, vol. 11, No. 6, pp. 512-517, Jun. 2012, with English translation.

Yoshida H., et al.: "Sodium Insertion Mechanism and Effect of Metal Substitution on Layered NaFeO2 as Positive Electrode for Na-Ion Batteries", Book of Reprints of the 79th Meeting of the Electromechanical Society of Japan, p. 465, upper part (PS29)—English translation.

International Search Report issued in PCT/JP2013/006845, dated Feb. 18, 2014, with English translation.

Yang, S. et al., "Synthesis and applications of Na—Mn—O materials for lithium ion batteries", Chemical Industry and Engineering Progress, vol. 28, Issue 9, Dec. 31, 2009, pp. 1553-1558. (with English Abstract).

Chinese Search Report issued in Chinese Application No. 20130063571.3 dated May 26, 2016, with English Translation.

* cited by examiner

COMPOSITE METAL OXIDE, METHOD FOR PRODUCING COMPOSITE METAL OXIDE, AND SODIUM SECONDARY BATTERY

RELATED APPLICATIONS

This application is the U.S. National Phase under 35 U.S.C. §371 of International Application No. PCT/JP2013/006845, filed on Nov. 21, 2013, which in turn claims benefit of U.S. Provisional Application No. 61/737,620, filed on Dec. 14, 2012, the disclosures of which Applications are incorporated by reference herein.

TECHNICAL FIELD

The present invention relates to a composite metal oxide, a method for producing a composite metal oxide, and a sodium secondary battery.

BACKGROUND ART

In recent years, the demand for secondary batteries has increased as power sources for transportation systems such as electric vehicles, hybrid electric vehicles, and plug-in hybrid electric vehicles and for large-scale electricity storage devices for home and commercial use. As these power sources, lithium secondary batteries are widely used. In lithium secondary batteries, lithium ions are used as carrier ions. However, lithium is a rare metal. It is a limited natural resource and expensive.

As an alternative to lithium secondary batteries, sodium secondary batteries have been studied. In sodium secondary batteries, sodium ions are used as carrier ions. Since sodium is more abundant and less expensive than lithium, sodium secondary batteries have attracted attention as inexpensive secondary batteries applicable to large-scale systems. However, sodium secondary batteries are still under research and development, and their electricity storage capacities are lower than those of lithium secondary batteries. Therefore, practical use of sodium secondary batteries requires development of higher capacity materials for positive and negative electrodes.

The use of a Na-containing transition metal oxide as a positive electrode material for sodium secondary batteries is reported. Patent Literature 1 discloses a composite metal oxide containing Na, Mn, and M1 (where M1 is Fe or Ni), with a Na:Mn:M1 molar ratio being a:1-b:b (where a is a value more than 0.5 and less than 1, and b is a value of 0.001 or more and 0.5 or less). Specifically, Patent Literature 1 discloses material compositions such as $Na_{0.7}Mn_{0.75}Fe_{0.25}O_2$ and $Na_{0.7}Mn_{0.75}Ni_{0.25}O_2$. According to this disclosure, when $Na_{0.7}Mn_{0.75}Fe_{0.25}O_2$ and $Na_{0.7}Mn_{0.75}Ni_{0.25}O_2$ are used as positive electrode active materials for sodium secondary batteries, the resulting charge-discharge capacities are 120 mAh/g and 119 mAh/g, respectively, after 10 cycles.

Patent Literature 2 discloses a mixture material containing a composite metal oxide composed of an oxide represented by the formula $Na_xFe_yMn_{1-y}O_2$ (where x is a value of more than ⅔ and less than 1, and y is a value of more than 0 and less than ⅔) and having a P2 structure and a layered oxide having an octahedral structure and/or a triangular-prism structure as a stacking fault. Specifically, Patent Literature 2 discloses a mixture material having a composition of $Na_{0.73}Mn_{0.45}Fe_{0.55}O_2$, composed of an oxide having the P2 structure and an oxide having the O3 structure and P3 structure. According to this disclosure, when this mixture material is used as a positive electrode active material for sodium secondary batteries, the resulting capacity is at least about 150 mAh/g.

Non-patent Literature 1 reports that when $Na_{2/3}[Fe_{1/2}Mn_{1/2}]O_2$ having the P2 structure is used as a positive electrode of a sodium secondary battery, the highest capacity of about 190 mAh/g can be obtained. It is also reported that when as another positive electrode material having a similar composition but a different crystal structure, $Na[Fe_{1/2}Mn_{1/2}]O_2$ having the O3 structure is used as a positive electrode of a sodium secondary battery, the resulting capacity is only about 100 to 110 mAh/g, which means that not only the composition but also the crystal structure is important. Non-patent Literature 1 also discloses $Na_{0.6}MnO_2$, $Na_{0.7}CoO_2$, and $Na_{2/3}[Ni_{1/3}Mn_{2/3}]O_2$ as other Na-containing transition metal oxides having the P2 structure and showing high capacities as described above.

In addition, for example, Patent Literature 2 discloses an example of the method for producing these Na-containing transition metal oxides, in which a Na compound and a transition metal oxide are mixed at a predetermined ratio and the resulting mixture is calcined in air at 900° C. for 12 hours to obtain a Na-containing transition metal oxide.

CITATION LIST

Patent Literature

Patent Literature 1: WO 2009/099061 A1
Patent Literature 2: WO 2012/060295 A1

Non-Patent Literature

Non-patent Literature 1: Nature Materials 11, 512-517, 2012

SUMMARY OF INVENTION

Technical Problem

Above-described conventional Na-containing transition metal oxides as reported as positive electrode materials for sodium secondary batteries need further improvement in their capacities. Therefore, it is an object of the present invention to provide, as a material for use as a positive electrode of a sodium secondary battery, a novel material that allows the resulting battery to have capacity characteristics superior to those of conventional batteries.

Solution to Problem

The present invention provides a composite metal oxide having a composition represented by the general formula $Na_xMe_yO_2$, where Me is at least one selected from the group consisting of Fe, Mn, and Ni, x satisfies $0.8<x\leq1.0$, and y satisfies $0.95\leq y<1.05$, and consisting of a P2 structure.

Advantageous Effects of Invention

When the composite metal oxide of the present invention is used as a positive electrode of a sodium secondary battery, the resulting battery can exhibit better capacity characteristics than those of conventional batteries, such as a high initial charge capacity in addition to a high reversible charge-discharge capacity.

DESCRIPTION OF EMBODIMENTS

The present inventors have newly found that conventional materials for use as positive electrodes of sodium secondary batteries, as mentioned in "BACKGROUND ART" above, have the following problems to be solved.

Among the conventional materials mentioned in "BACKGROUND ART", the material described in Non-patent Literature 1 is reported as a material that can deliver the highest capacity when used as a positive electrode of a sodium secondary battery. Non-patent Literature 1 reports that the highest capacity of 190 mAh/g can be obtained when $Na_{2/3}[Fe_{1/2}Mn_{1/2}]O_2$ having the P2 structure is used as a positive electrode of a sodium secondary battery. However, as a result of intensive studies, the present inventors have found that this material has a practical disadvantage. When a charge-discharge test was carried out using the above-mentioned $Na_{2/3}[Fe_{1/2}Mn_{1/2}]O_2$ having the P2 structure as a positive electrode and Na metal as a negative electrode, the initial charge capacity was as low as about 120 mAh/g, although the second charge-discharge capacity was 190 mAh/g. That is, in the case where a material containing a large amount of Na, such as Na metal, is used as a negative electrode, a decrease in the initial charge capacity does not really matter because Na is supplied from the negative electrode. However, in the case where a material not containing Na is used as a negative electrode, Na moving between the positive and negative electrodes is supplied only from a positive electrode. Therefore, the above-mentioned material can only deliver a charge-discharge capacity up to 120 mAh/g due to the limited amount of Na supplied, although it has the ability of delivering a charge-discharge capacity up to 190 mAh/g. Hence, the above-mentioned material can be considered as a material unsuitable for use in a sodium secondary battery to obtain a high capacity, due to design limitations such as a negative electrode material.

As described above, for the practical use of sodium secondary batteries, there has been a need for positive electrode materials that can deliver high initial charge capacities in addition to high reversible charge-discharge capacities, but materials that meet these requirements have not yet been found.

The present inventors have invented, as a material for use as a positive electrode of a sodium secondary battery, a material having a combination of a specific composition and a specific crystal structure and thus capable of delivering a higher initial charge capacity than already known materials in addition to a high reversible charge-discharge capacity. The present inventors have also invented a novel method by which such a material can be produced.

A first aspect of the present invention provides a composite metal oxide having a composition represented by the general formula $Na_xMe_yO_2$, where Me is at least one selected from the group consisting of Fe, Mn, and Ni (as for the "Me", the same applies hereinafter), x satisfies $0.8<x\leq1.0$, and y satisfies $0.95\leq y<1.05$, the composite metal oxide consisting of a P2 structure.

When the composite metal oxide according to the first aspect is used as a positive electrode of a sodium secondary battery, the resulting battery can exhibit a high initial charge capacity in addition to a high reversible charge-discharge capacity. In addition, the sodium secondary battery using the composite metal oxide according to the first aspect can provide a higher capacity sodium secondary battery than conventional ones.

A second aspect of the present invention provides the composite metal oxide according to the first aspect, wherein the Me has a composition represented by the general formula $Fe_aMn_b$, where a and b satisfy $0<a\leq0.5$ and $0.95\leq a+b<1.05$.

According to the composite metal oxide according to the second aspect, it is easier to obtain the P2 structure.

A third aspect of the present invention provides the composite metal oxide according to the first or second aspect, wherein the x is 1.0.

When the composite metal oxide according to the third aspect is used as a positive electrode of a sodium secondary battery, a high capacity, in particular a high initial charge capacity can be obtained.

A fourth aspect of the present invention provides a method for producing a composite metal oxide, including the steps of:

(I) mixing a Na-containing compound and a Me-containing compound at a predetermined molar ratio Na:Me to obtain a mixture and calcining the mixture to obtain a composite material consisting of Na, Me, and O; and (II) reducing the composite material that is in contact with a solution containing Na ions, so as to increase a molar proportion of Na in the composite material.

According to the production method according to the fourth aspect, it is possible to produce a composite metal oxide having both a specific composition and a specific crystal structure, which cannot be obtained by merely mixing a Na-containing compound and a Me-containing compound and calcining the resulting mixture. For example, according to the production method according to the fourth aspect, it is also possible to produce a composite metal oxide consisting of Na, Me, and O with a high molar proportion of Na and consisting of the P2 structure, which cannot be obtained by merely mixing a Na-containing compound and a Me-containing compound and calcining the resulting mixture.

A fifth aspect of the present invention provides the method for producing a composite metal oxide according to the fourth aspect, wherein in the step (I), the Na-containing compound and the Me-containing compound are mixed at the molar ratio Na:Me of z:1 so as to obtain the composite material consisting of Na, Me, and O, where z satisfies $0.6<z<0.7$.

According to the production method according to the fifth aspect, it is possible to synthesize a composite metal oxide consisting of Na, Me, and O and consisting of the P2 structure in the step (I). Therefore, it is possible to increase the molar proportion of Na in the composite metal oxide while maintaining the crystal structure thereof in the step (II). Thus, according to the fifth aspect, it is possible to produce a composite metal oxide consisting of Na, Me, and O with a high molar proportion of Na and consisting of the P2 structure.

A sixth aspect of the present invention provides the method for producing a composite metal oxide according to the fourth or fifth aspect, wherein in the step (II), a composite metal oxide having a composition represented by the general formula $Na_xMe_yO_2$ is obtained, where x satisfies $0.8<x\leq1.0$ and y satisfies $0.95\leq y<1.05$.

According to the production method according to the sixth aspect, it is possible to produce, as a material for use as a positive electrode of a sodium secondary battery, a material that allows the battery to have a high initial charge capacity in addition to a high reversible charge-discharge capacity.

A seventh aspect of the present invention provides the method for producing a composite metal oxide according to any one of the fourth to sixth aspects, wherein in the step (II), the solution containing Na ions is a reducing solution containing Na ions.

In the production method according to the seventh aspect, the composite material obtained in the step (I) is subjected to reduction treatment only by the contact with a reducing solution. Therefore, unlike electrochemical reduction treatment, this method does not require the use of an electrochemical device (power source) for controlling the potential or current for the reduction treatment of the composite material obtained in the step (I), and thus the composite metal oxide can be produced more easily. In addition, in this reduction treatment, it is also possible to use the composite material obtained in the step (I) in the form of an electrode containing this composite material or in the form of a powder of this composite material. Thus, this production method has a high degree of flexibility.

An eighth aspect of the present invention provides the method for producing a composite metal oxide according to the seventh aspect, wherein the reducing solution containing Na ions includes an ether solvent in which an aromatic compound is dissolved.

According to the production method according to the eighth aspect, it is possible to obtain a reducing solution in which a high concentration of Na ions and an aromatic compound are dissolved, and thus to perform the step of reducing the composite material obtained in the step (I) speedily. This contributes to reducing the cost of the production method.

A ninth aspect of the present invention provides the method for producing a composite metal oxide according to the eighth aspect, wherein the aromatic compound is an organic compound capable of forming a complex with sodium metal.

According to the production method according to the ninth aspect, it is possible to obtain a stable reducing solution in which a high concentration of Na ions and an aromatic compound are dissolved, and thus to perform the step of reducing the composite material obtained in the step (I) stably and speedily. This contributes to reducing the cost of the production method.

A tenth aspect of the present invention provides the method for producing a composite metal oxide according to the eighth or ninth aspect, wherein the aromatic compound includes at least one selected from the group consisting of a compound in which two or more benzene rings are condensed, a compound in which two or more benzene rings are bonded via a single bond, and a carbonyl compound.

According to the production method according to the tenth aspect, it is easy to obtain a reducing solution having reducing power adequate to reduce the composite material obtained in the step (I). It is also possible to reuse the reducing solution after being used in the reduction step. This reducing solution containing an aromatic compound is oxidized after use, but it can be reused as a reducing solution, for example, by adding metallic sodium to the used solution. This contributes to reducing the cost of the production method.

An eleventh aspect of the present invention provides the method for producing a composite metal oxide according to any one of the eighth to tenth aspects, wherein the ether solvent includes at least one selected from the group consisting of tetrahydrofuran, 2-methyltetrahydrofuran, 1,2-dimethyltetrahydrofuran, and dimethoxyethane.

Na metal and aromatic compounds are highly soluble in the ether solvent used in the production method according to the eleventh aspect. Therefore, according to the production method according to the eleventh aspect, it is possible to accelerate the reduction of the composite material obtained in the step (I) and thus to increase the molar proportion of Na in the composite material consisting of Na, Me, and O obtained in the step (I) in a shorter time.

A twelfth aspect of the present invention provides a sodium secondary battery including:

a positive electrode containing a composite metal oxide having a composition represented by the general formula $Na_xMe_yO_2$, where x satisfies $0.8<x\leq1.0$ and y satisfies $0.95\leq y<1.05$, the composite metal oxide consisting of a P2 structure;

a negative electrode containing a material capable of absorbing and desorbing Na ions; and an electrolyte containing Na ions and anions.

In the sodium secondary battery according to the twelfth aspect of the present invention, the positive electrode contains a composite metal oxide having a composition represented by the general formula $Na_xMe_yO_2$, where x satisfies $0.8<x\leq1.0$ and y satisfies $0.95\leq y<1.05$, and consisting of a P2 structure. Therefore, this battery can exhibit a high initial charge capacity in addition to a high reversible charge-discharge capacity.

Hereinafter, embodiments of the present invention will be described.

(First Embodiment)

In the first embodiment, an embodiment of the composite metal oxide of the present invention is described. A composite metal oxide of the present embodiment has a composition represented by the general formula $Na_xMe_yO_2$, where x satisfies $0.8<x\leq1.0$ and y satisfies $0.95\leq y<1.05$. In addition, the composite metal oxide of the present embodiment consists of a P2 structure. This composite metal oxide is suitably used as a positive electrode material of a sodium secondary battery. The composite metal oxide of the present embodiment may be a composite metal oxide in which x is 1.0, that is, a composite metal oxide having a composition of $NaMe_yO_2$. The composite metal oxide of the present embodiment may also be a composite metal oxide in which x and y are 1.0, that is, a composite metal oxide having a composition of $NaMeO_2$. The composite metal oxide having a composition of $NaMeO_2$ and consisting of the P2 structure is a positive electrode material particularly suitable for sodium secondary batteries.

Desirably, the Me has a composition represented by the general formula $Fe_aMn_b$, where a and b satisfy $0<a\leq0.5$ and $0.95\leq a+b<1.05$. This means that the composite metal oxide of the present embodiment desirably has a composition represented by the general formula $Na_xFe_aMn_bO_2$. More desirably, a satisfies $0.3<a\leq0.5$. As used herein, a+b is desirably 1, that is, a+b desirably has a molar ratio of 1/2 to that of oxygen. However, in this case, due to errors in weighing materials prepared, errors in analysis, minor defects of the materials, etc. the value of a+b may vary as long as it is in a range of 0.95 or more and less than 1.05 for practical applications.

The crystal structure of a composite metal oxide can be determined by X-ray diffraction (XRD) measurement. From the results of XRD of the P2 crystal structure, diffraction lines derived from the (003) plane, the (006) plane, the (101) plane, the (102) plane, the (104) plane, the (107) plane, the (108) plane, etc. are observed in ascending order of angles. Thus, the P2 structure can be identified from these diffraction lines. The XRD measurement can be performed by a standard method used in laboratories. For example, the XRD measurement can be performed by scanning a range of 5° to 80° (2θ) with a Cu tube at an accelerating voltage of 40 kV and a current of 40 mA in the 2θ/θ method.

The P2 structure is a hexagonal crystal structure having symmetry of space group $P6_3/mmc$.

(Second Embodiment)

In the second embodiment, an embodiment of a method for producing a composite metal oxide is described. The method for producing a composite metal oxide of the present embodiment includes the steps of:

(I) mixing a Na-containing compound and a Me-containing compound at a predetermined molar ratio Na:Me to obtain a mixture and calcining the mixture to obtain a composite material consisting of Na, Me, and O; and (II) reducing the composite material that is in contact with a solution containing Na ions, so as to increase a molar proportion of Na in the composite material.

According to the production method of the present embodiment, it is possible to obtain a P2-structure single phase composite metal oxide having a composition represented by the general formula $Na_xMe_yO_2$ ($0.8<x\leq1.0$ and $0.95\leq y<1.05$), although such a P2-structure single phase composite metal oxide cannot be obtained by conventional methods. According to the production method of the present embodiment, it is possible to produce a desired composite metal oxide having a combination of a specific composition and a specific crystal structure, which is difficult to obtain by conventional methods.

In the step (I), the composite material consisting of Na, Me, and O may be synthesized, for example, by mixing the Na-containing compound and the Me-containing compound at the molar ratio Na:Me of z:1 ($0.6<z<0.7$) to obtain a mixture and calcining the mixture. The composite material thus obtained has a composition represented by the general formula $Na_zMeO_2$ ($0.6<z<0.7$). In the step (II), it is also possible to adjust as appropriate the conditions such as a reduction treatment time so as to obtain a composite metal oxide having a composition represented by the general formula $Na_xMe_yO_2$ ($0.8<x\leq1.0$ and $0.95\leq y<1.05$).

As a result of intensive studies, the present inventors have found that a composite metal oxide as described in the first embodiment, for example, cannot be obtained by merely mixing a certain Na-containing compound and a certain Me-containing compound and calcining the resulting mixture. This is because when the material compounds are mixed at a molar ratio of Na to Me of more than 0.8 and 1 or less to obtain a mixture and the mixture is calcined, a P2-structure single phase cannot be obtained, and instead a O3 structure and an impurity phase are formed because they are more stable in that composition and at that calcination temperature. Therefore, it is necessary to first mix the material compounds to obtain a mixture having a composition that easily allows the mixture to have the P2 structure by calcination, that is, to mix the material compounds at a molar ratio of Na to Me of more than 0.6 and less than 0.7 to obtain that mixture and calcine the mixture to synthesize $Na_zMeO_2$ having the P2 structure, and then in the following step (II), to subject the P2-structure $Na_zMeO_2$ to reduction treatment so as to increase the molar proportion of Na in the $Na_xMeO_2$ while maintaining its P2 structure. Thus, the composition of $Na_xMe_yO_2$ ($0.8<x\leq1.0$ and $0.95\leq y<1.05$) can be obtained.

Specifically, the composition of $Na_xMe_yO_2$ ($0.8<x\leq1.0$ and $0.95\leq y<1.05$) can be obtained by bringing the $Na_zMeO_2$ ($0.6<z<0.7$) thus obtained into contact with a reducing solution containing Na ions. In the reducing solution containing Na ions, an ether solvent in which an aromatic compound is dissolved can be suitably used. As the aromatic compound, an organic compound capable of forming a complex with sodium metal can be used. As the aromatic compound, at least one compound selected from the group consisting of a compound in which two or more benzene rings are condensed, a compound in which two or more benzene rings are bonded via a single bond, and a carbonyl compound can be used. Specific examples of the compound in which two or more benzene rings are condensed include acene compounds such as naphthalene, anthracene, and pentacene, phenanthrene, pyrene, and triphenylene. Specific examples of the compound in which two or more benzene rings are bonded via a single bond include biphenyl, terphenyl, and quaterphenyl. Specific examples of the carbonyl compound include benzophenone, benzoquinone, naphthoquinone, and phenanthrenequinone.

As specific examples of the ether solvent, at least one selected from the group consisting of tetrahydrofuran, 2-methyltetrahydrofuran, 1,2-dimethyltetrahydrofuran, and dimethoxyethane is suitably used. Since Na metal and aromatic compounds are highly soluble in these solvents, the composite material obtained in the step (I) can be reduced more speedily and the molar proportion of Na in the composite material consisting of Na, Me, and O obtained in the step (I) can be increased in a shorter time.

If the $Na_zMeO_2$ ($0.6<z<0.7$) is formed into an electrode, $Na_xMe_yO_2$ ($0.8<x\leq1.0$ and $0.95\leq y<1.05$) can also be obtained by electrochemically reducing the $Na_zMeO_2$ in a solution containing Na ions. When a working electrode containing $Na_zMeO_2$ ($0.6<z<0.7$) and a sodium metal counter electrode are used, electrochemical reduction reaction can be initiated by applying a potential of about 1.5 V (with respect to the Na reference electrode) to the working electrode.

(Third Embodiment)

Figure 1:
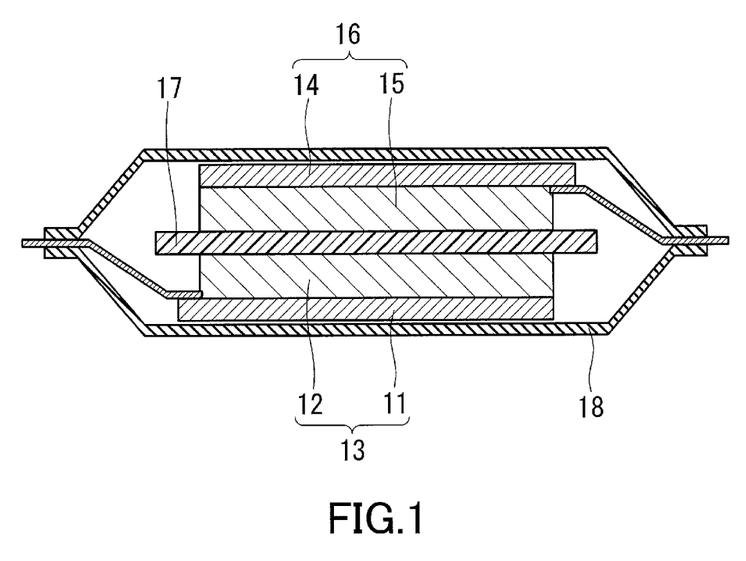
FIG. 1 is a cross-sectional view showing an embodiment of a sodium secondary battery of the present invention.

In the third embodiment, an embodiment of the sodium secondary battery of the present invention is described. FIG. 1 shows the schematic structure of a sodium secondary battery of the present embodiment. A positive electrode 13 includes a positive electrode current collector 11 and a positive electrode material mixture layer 12 formed thereon. A negative electrode 16 includes a negative electrode current collector 14 and a negative electrode material mixture layer 15 formed thereon. The positive electrode 13 and the negative electrode 16 face each other with a separator 17 interposed therebetween, and an outer casing 18 covers the electrodes 13 and 16 and the separator 17 to form a battery.

The positive electrode material mixture layer 12 contains the composite metal oxide of the first embodiment as a positive electrode active material, and may optionally contain a conductive agent, an ion conductor, and/or a binder in addition to the positive electrode active material.

The conductive agent and the ion conductor are used to reduce the electrode resistance. Examples of the conductive agent include carbon materials such as carbon black, graphite, and acetylene black, and conductive polymer compounds such as polyaniline, polypyrrole and polythiophene. Examples of the ion conductor include gel electrolytes such as polymethyl methacrylate and polymethyl methacrylate, and solid electrolytes such as polyethylene oxide.

The binder is used, for example, to improve the binding property of the materials constituting the electrode. Specific examples of the binder include polyvinylidene fluoride, vinylidene fluoride-hexafluoropropylene copolymer, vinylidene fluoride-tetrafluoroethylene copolymer, polytetrafluoroethylene, carboxymethyl cellulose, polyacrylic acid, styrene-butadiene copolymer rubber, polypropylene, polyethylene, and polyimide.

As the positive electrode current collector 11, a porous or nonporous sheet or film made of a metallic material such as aluminum, stainless steel, titanium, or an alloy of these can be used. Aluminum and an aluminum alloy are preferred because they are inexpensive and can be easily formed into thin films. As the sheet or film, a metal foil, a metal mesh or the like is used. A carbon material, such as carbon, may be applied to the surface of the positive electrode current collector 11 in order to reduce the resistance, provide the catalytic effect, and strengthen the bond between the positive electrode material mixture layer 12 and the positive electrode current collector 11 obtained by bonding chemically or physically the positive electrode material mixture layer 12 and the positive electrode current collector 11.

The negative electrode material mixture layer 15 contains a negative electrode active material capable of absorbing and desorbing Na ions, and may optionally contain a conductive agent, an ion conductor, and/or a binder in addition to the negative electrode active material. The same conductive agent, ion conductor, and binder as those described for the positive electrode can be used. The negative electrode active material is not particularly limited as long as it is a known material capable of absorbing and desorbing Na ions. For example, metallic sodium, sodium alloy, carbon, metal oxide, etc. can be used. As the sodium alloy, for example, an alloy containing Sn, Ge, Zn, Bi, or In an be used. As the carbon, for example, non-graphite carbon such as hard carbon or coke can be used. As the metal oxide, for example, sodium titanate represented by $Na_2Ti_3O_7$ or lithium titanate represented by $Li_4Ti_5O_{12}$ can be used. During charging, metallic sodium may be precipitated in the form of dendrite, which is difficult to control. Therefore, the above-mentioned materials capable of absorbing and desorbing Na ions, other than metallic sodium, are preferred. It is particularly preferable to select the negative electrode active material from the carbons and metal oxides. In this case, the effects of increasing the capacity and making metallic Na less susceptible to precipitation in the form of dendrite during charging are obtained.

As the negative electrode current collector 14, a porous or nonporous sheet or film made of a metallic material such as aluminum, stainless steel, nickel, copper, or an alloy of these can be used. Aluminum and an aluminum alloy are preferred because they are inexpensive and can be easily formed into thin films. As the sheet or film, a metal foil, a metal mesh or the like is used. A carbon material, such as carbon, may be applied to the surface of the negative electrode current collector 14 in order to reduce the resistance, provide the catalytic effect, and strengthen the bond between the negative electrode material mixture layer 15 and the negative electrode current collector 14 obtained by bonding chemically or physically the negative electrode material mixture layer 15 and the negative electrode current collector 14.

As the separator 17, a porous membrane made of polyethylene, polypropylene, glass, cellulose, ceramic, or the like is used. Before use, the porous membrane is impregnated with an electrolyte in such a manner that the electrolyte penetrate into the pores. Examples of the electrolyte used in the present embodiment include non-aqueous solvents, gel electrolytes, and solid electrolytes containing sodium salts.

Examples of the sodium salts that can be used include fluorine-containing compound salts such as hexafluorophosphate ($PF_6-$) and tetrafluoroborate ($BF_4-$); and imide salts such as perchlorate ($ClO_4-$), bis(trifluoromethylsulfonyl)imide ($N(SO_2CF_3)_2-$), bis(perfluoroethylsulfonyl)imide ($N(SO_2C_2F_5)_2-$), and bis(fluoromethylsulfonyl)imide ($N(SO_2F)_2-$). A fluorine-containing compound salt or an imide salt is suitably used from the viewpoints of potential stability and ion conductivity. As the non-aqueous solvent, a cyclic or chain ester, ether, carbonate ester, or the like is suitably used. Examples of cyclic esters include γ-BL. Examples of chain esters include methylpropionate. Examples of cyclic ethers include tetrahydrofuran and dioxolane. Examples of chain ethers include dimethoxyethane and trimethoxyethane. Examples of cyclic carbonate esters include propyrene carbonate and ethylene carbonate. Examples of chain carbonate esters include dimethyl carbonate, diethyl carbonate, and ethyl methyl carbonate. These solvents may be used alone or in combination.

EXAMPLES

Hereinafter, examples of the present invention are described in detail, but the present invention is not limited to the following examples.

Example 1

Figure 2:
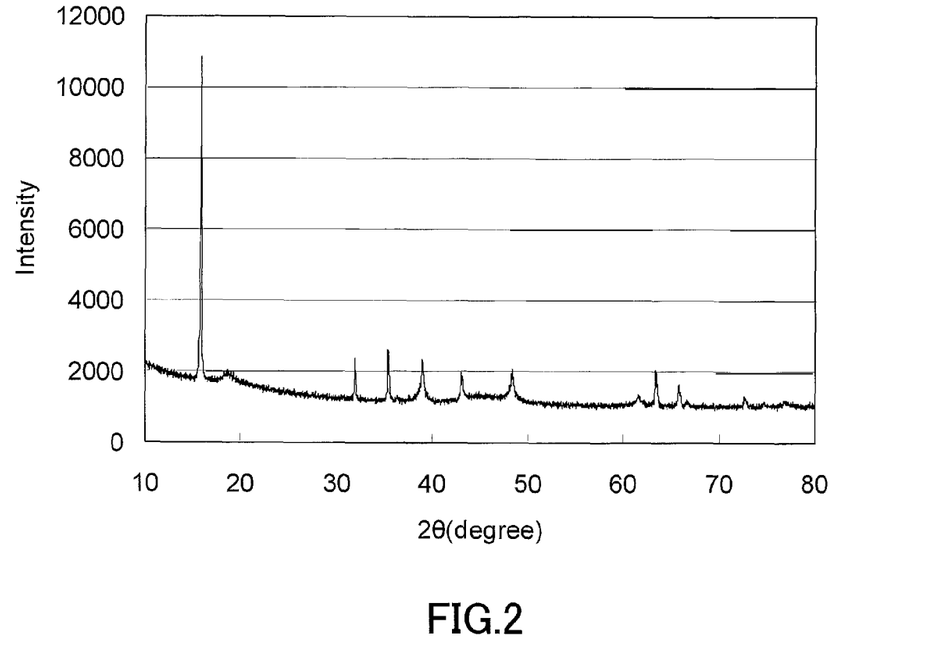
FIG. 2 shows the X-ray diffraction result of a powder synthesized in Example 1.

(1) Preparation of Composite Metal Oxide $Fe_2O_3$ and $Mn_2O_3$ were weighed at a molar ratio of 1:1 and mixed with ethanol as a dispersion medium in a ball mill for 12 hours. The resulting mixed powder and $Na_2O_2$ were weighed at a molar ratio Na:Fe:Mn of 0.67:0.5:0.5 and mixed in a mortar. The resulting mixed powder was calcined in air at 900° C. for 12 hours. Thus, $Na_{0.67}Fe_{0.5}Mn_{0.5}O_2$ was obtained. FIG. 2 shows the XRD result of the synthesized powder. The XRD measurement was performed by scanning a range of 5° to 80° (2θ) with a Cu tube at an accelerating voltage of 40 kV and a current of 40 mA in the 2θ/θ method. Diffraction lines were observed around 15.8°, 31.9°, 35.3°, 38.9°, and 43.1° in ascending order of angles. These diffraction lines were those attributed to the (003) plane, the (006) plane, the (101) plane, the (102) plane, and the (104) plane, respectively. This XRD result confirmed that the synthesized powder consisted of the P2 structure.

The synthesized powder, acetylene black as a conductive agent, and polyvinylidene fluoride as a binder were weighed at a weight ratio of 8:1:1 and dispersed in a MNP solvent to obtain a slurry. The slurry thus prepared was applied onto an Al current collector using a coater. The coated electrode plate was rolled using a rolling mill and formed into an electrode by punching the plate into a 20-mm square piece. Thus, an electrode ($Na_{0.67}Fe_{0.5}Mn_{0.5}O_2$ electrode) containing P2-structure $Na_{0.67}Fe_{0.5}Mn_{0.5}O_2$ was obtained.

Next, the $Na_{0.67}Fe_{0.5}Mn_{0.5}O_2$ electrode was subjected to reduction treatment. 0.96 g of $NaPF_6$ and 0.3 g of benzophenone were dissolved in 12 g of 1,2-dimethoxyethane, and then 38 mg of metallic sodium was dissolved therein to obtain a green reducing solution. The $Na_{0.67}Fe_{0.5}Mn_{0.5}O_2$ electrode was immersed in the reducing solution thus obtained and maintained therein for 30 minutes. Then, the electrode was washed twice with 1,2-dimethoxyethane and vacuum-dried. Thus, a positive electrode containing the composite metal oxide of the present invention was obtained.

Figure 3:
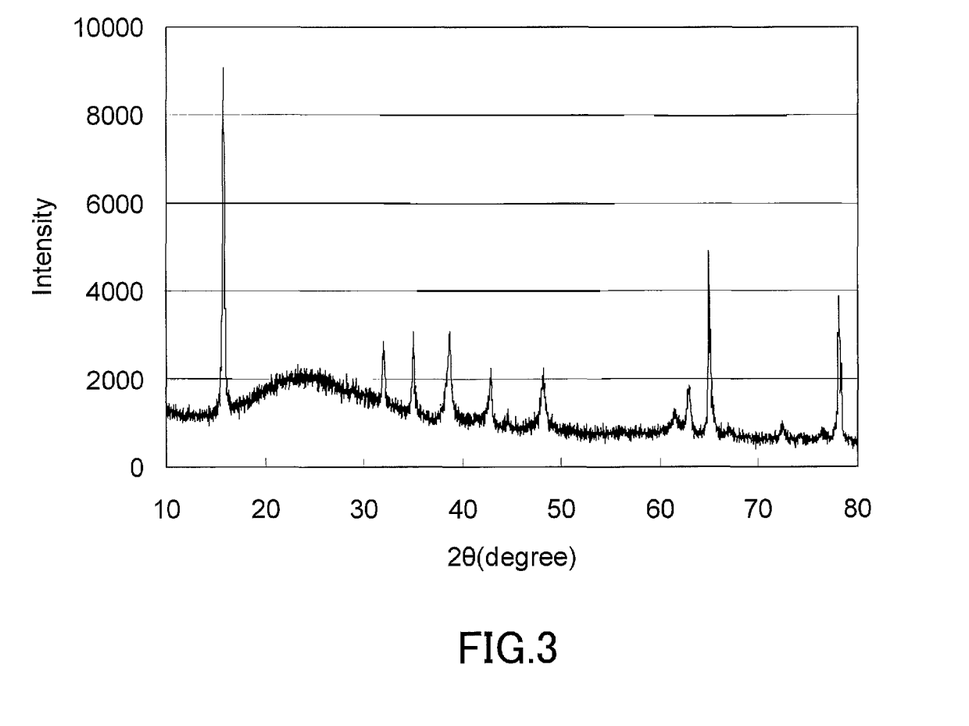
FIG. 3 shows the X-ray diffraction result of a positive electrode obtained in Example 1.

FIG. 3 shows the XRD result of the positive electrode thus obtained. The measurement conditions were the same as those described above. Broad diffraction from 20° to 30° and diffraction lines around 65.0° and 78.1° attributed to acetylene black and the Al current collector respectively were observed. The other diffraction lines almost matched those shown in FIG. 2. This XRD result confirmed that the composite metal oxide contained in the obtained positive electrode also consisted of the P2 structure. It was also confirmed by ICP emission spectroscopy that the composite metal oxide contained in the obtained positive electrode was $Na_{0.85}Fe_{0.5}Mn_{0.5}O_2$.

(2) Preparation of Sodium Secondary Battery

A battery was prepared in an Ar atmosphere in a glove box at a dew point of −60° C. and an oxygen concentration of 1 ppm or less. A laminated sodium secondary battery shown in FIG. 1 and described in the third embodiment was prepared.

Sodium metal was pressed onto a 20-mm square nickel mesh to obtain a negative electrode. The positive electrode obtained in (1) above and the negative electrode were placed face to face with a microporous polyethylene membrane separator impregnated with an electrolyte solution being interposed between the electrodes, and then sealed together. Thus, a laminated sodium secondary battery was prepared. The electrolyte solution used was prepared by dissolving $NaPF_6$ at 1 mol % in a mixed solvent of ethylene carbonate and diethyl carbonate at a volume ratio of 1:2.

Example 2

A positive electrode containing a composite metal oxide was produced in the same manner as in Example 1, except that the reduction treatment was performed in a different manner. An electrode containing the P2-structure $Na_{0.67}Fe_{0.5}Mn_{0.5}O_2$ prepared in the same manner as in Example 1 was immersed in an electrolyte solution prepared by dissolving $NaPF_6$ at 1 mol % in a mixed solvent of ethylene carbonate and diethyl carbonate at a volume ratio of 1:2, and maintained for 30 minutes while applying 1.5 V to the electrode with respect to sodium metal. Then, the electrode was washed twice with diethyl carbonate and vacuum-dried. Thus, a positive electrode containing the composite metal oxide of the present invention was obtained.

It was confirmed by XRD measurement that the composite metal oxide contained in the obtained positive electrode consisted of the P2 structure. It was also confirmed by ICP emission spectroscopy that the composite metal oxide contained in the obtained positive electrode was $Na_{1.0}Fe_{0.5}Mn_{0.5}O_2$.

Using the positive electrode thus obtained, a laminated sodium secondary battery was prepared in the same manner as in Example 1, except that a different positive electrode was used.

Comparative Example 1

An electrode containing P2-structure $Na_{0.67}Fe_{0.5}Mn_{0.5}O_2$ as described in Example 1 was used as a positive electrode without being subjected to reduction treatment with a reducing solution. A laminated sodium secondary battery was prepared in the same manner as in Example 1, except that a different positive electrode was used.

Comparative Example 2

Figure 4:
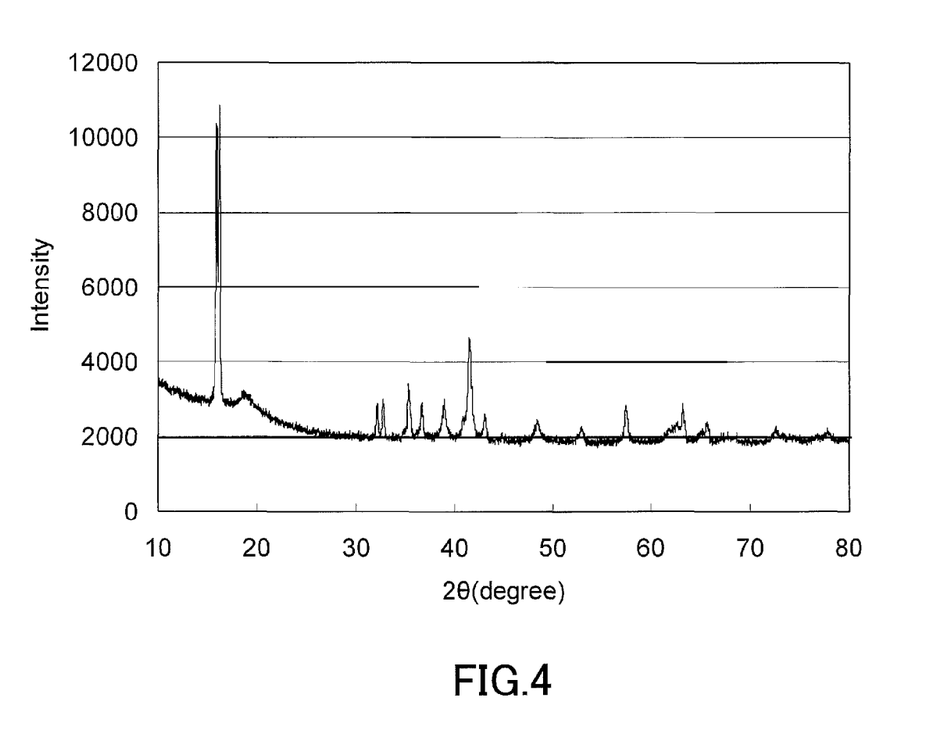
FIG. 4 shows the X-ray diffraction result of a powder synthesized in Comparative Example 2.

$Fe_2O_3$ and $Mn_2O_3$ were weighed at a molar ratio of 1:1 and mixed with ethanol as a dispersion medium in a ball mill for 12 hours. The resulting mixed powder and $Na_2O_2$ were weighed at a molar ratio Na:Fe:Mn of 0.75:0.5:0.5 and mixed in a mortar. The resulting mixed powder was calcined in air at 900° C. for 12 hours. Thus, $Na_{0.75}Fe_{0.5}Mn_{0.5}O_2$ was obtained. FIG. 4 shows the XRD result of the synthesized powder. The measurement conditions were the same as those in Example 1. In addition to the diffraction pattern attributed to the P2 structure shown in FIG. 2, the diffraction lines around 16.2°, 32.8°, 36.7°, 41.6°, and 53.1° were newly observed. These newly observed diffraction lines were identified as those attributed to the (002) plane, the (004) plane, the (100) plane, the (102) plane, and the (104) plane respectively and derived from the O3 structure. The O3 structure is known as the structure of α-$NaFeO_2$ and is a crystal structure having the symmetry of space group R3-m. These results confirmed that the synthesized powder was a mixture of the P2 structure and the O3 structure.

The synthesized powder was formed into an electrode in the same manner as in Example 1 and used as a positive electrode. A laminated sodium secondary battery was prepared in the same manner as in Example 1, except that a different positive electrode was used.

Comparative Example 3

Figure 5:
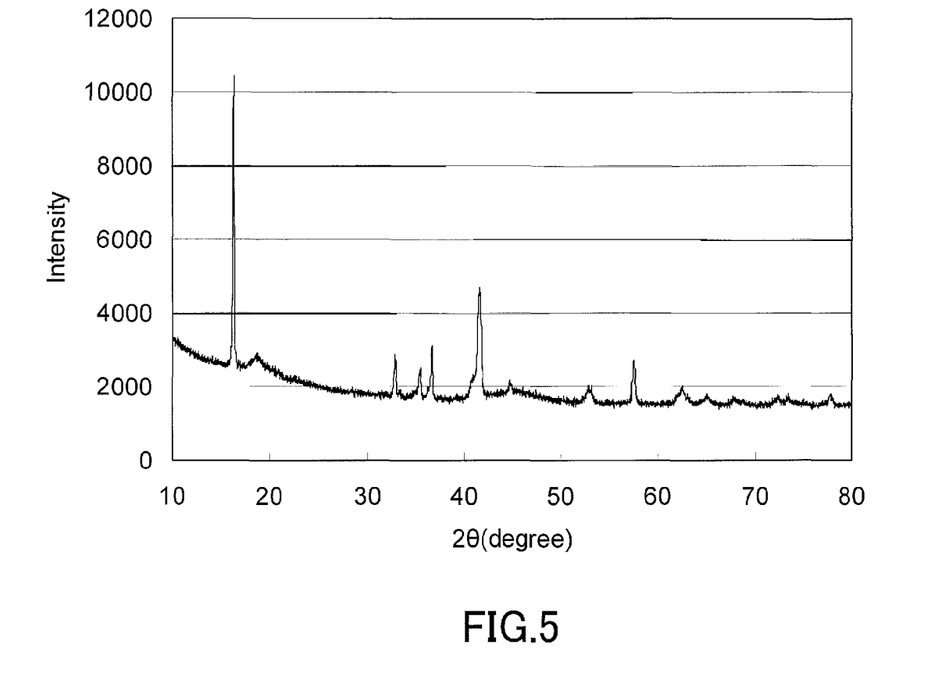
FIG. 5 shows the X-ray diffraction result of a powder synthesized in Comparative Example 3.

$Fe_2O_3$ and $Mn_2O_3$ were weighed at a molar ratio of 1:1 and mixed with ethanol as a dispersion medium in a ball mill for 12 hours. The resulting mixed powder and $Na_2O_2$ were weighed at a molar ratio Na:Fe:Mn of 1.0:0.5:0.5 and mixed in a mortar. The resulting mixed powder was calcined in air at 900° C. for 12 hours. Thus, $Na_{1.0}Fe_{0.5}Mn_{0.5}O_2$ was obtained. FIG. 5 shows the XRD result of the synthesized powder. The measurement conditions were the same as those in Example 1. The diffraction lines around 16.2°, 32.8°, 36.7°, 41.6°, and 53.1° were identified as those attributed to the (002) plane, the (004) plane, the (100) plane, the (102) plane, and the (104) plane respectively and derived from the O3 structure. These results confirmed that the synthesized powder consisted of the O3 structure.

The synthesized powder was formed into an electrode in the same manner as in Example 1 and used as a positive electrode. A laminated sodium secondary battery was prepared in the same manner as in Example 1, except that a different positive electrode was used.

[Charge-discharge Test]

For the batteries of Examples 1 and 2 and Comparative Examples 1 to 3, the charge-discharge test was performed under the following conditions. The charge-discharge test was performed in a thermostatic bath at 25° C. The test was started with charging, then, after a 20-minute pause, discharging was performed, and the cycle of charging and discharging was repeated. Charging was performed at a current of 0.05 C (20-hour rate) with respect to the theoretical capacity of the positive electrode active material by a constant current and constant voltage charging method. The maximum charge voltage was 4.2 V, the minimum current at a constant voltage was 0.0005 C (200-hour rate). Discharging was performed at a constant current of 0.05 C as in the case of charging. The minimum discharge voltage was 1.5 V. For each battery, the initial charge capacity (mAh/g$^{-1}$) and the initial discharge capacity (mAh/g$^{-1}$) per gram of the positive electrode active material were calculated from the capacities measured. The composition and crystal structure of the positive electrode active material as well as the calculated capacities are shown collectively in Table 1.

TABLE 1

| Positive electrode | | Initial charge capacity mAhg$^{-1}$ | Initial discharge capacity mAhg$^{-1}$ |
|---|---|---|---|
| Composition | Crystal structure | | |
| Example 1 | Na$_{0.85}$Fe$_{0.5}$Mn$_{0.5}$O$_2$ | P2 | 166 | 189 |
| Example 2 | Na$_{1.0}$Fe$_{0.5}$Mn$_{0.5}$O$_2$ | P2 | 190 | 188 |
| Com. Example 1 | Na$_{0.67}$Fe$_{0.5}$Mn$_{0.5}$O$_2$ | P2 | 120 | 189 |
| Com. Example 2 | Na$_{0.75}$Fe$_{0.5}$Mn$_{0.5}$O$_2$ | P2 + O3 | 115 | 125 |
| Com. Example 3 | Na$_{1.0}$Fe$_{0.5}$Mn$_{0.5}$O$_2$ | O3 | 110 | 56 |

As shown in Table 1, the only difference among the batteries of Examples 1 and 2 and Comparative Example 1 is the amount of Na in the Na-containing metal oxide as a positive electrode active material, and the positive electrodes of these batteries consist of the same P2 crystal structure. All of these batteries delivered high discharge capacities of 188 mAh/g or more, but their initial charge capacities varied. Specifically, the battery of Comparative Example 1 showed a lower initial charge capacity of 120 mAh/g, while the batteries of Examples 1 and 2 showed higher capacities of 166 mAh/g and 190 mAh/g respectively. These results confirmed that the P2-structure material represented by Na$_x$Fe$_{0.5}$Mn$_{0.5}$O$_2$, where x is 0.85 or 1.0, showed a higher initial charge capacity than the conventional P2-structure material represented by Na$_x$Fe$_{0.5}$Mn$_{0.5}$O$_2$, where x is 0.67.

In Example 1, Na$_{0.85}$Fe$_{0.5}$Mn$_{0.5}$O$_2$ was obtained by finishing the reduction treatment in a solution in a short time of 30 minutes, which means that the composition can be temporally controlled. Thus, if the reduction treatment is performed for a longer period of time, a material similar to Na$_{1.0}$Fe$_{0.5}$Mn$_{0.5}$O$_2$ as shown in Example 2 can be obtained.

On the other hand, in Comparative Examples 2 and 3, a compound containing Na with an increased molar proportion and a compound containing a transition metal were mixed and the resulting mixture was calcined, but a P2-structure single phase material having a high capacity could not be obtained. In Comparative Example 2, the O3 structure with a lower capacity than the P2 structure was formed in addition to the P2 structure. In Comparative Example 3, only the O3 structure with a lower capacity was formed. Therefore, the initial discharge capacities were 125 mAh/g and 56 mAh/g respectively in Comparative Example 2 and Comparative Example 3, which were significantly lower than those of the materials consisting of the P2 structure. These results indicate that conventional synthesis methods are not capable of synthesizing the composite metal oxide of the present invention, that is, a composite metal oxide having a composition represented by the general formula Na$_x$Me$_y$O$_2$ (0.8<x≤1.0 and 0.95≤y<1.05) and consisting of the P2 structure.

Experiments were also performed on systems having Fe/Mn ratios with different proportions of Fe and Mn. P2-structure single-phase materials were obtained by calcinating Na$_{0.67}$Fe$_{0.33}$Mn$_{0.67}$O$_2$ and Na$_{0.67}$Fe$_{0.25}$Mn$_{0.75}$O$_2$ compositions, and the proceeding of reduction reaction of these materials was also observed in the following reduction treatment. As a result, it was confirmed that even if a system having a Fe/Mn ratio with different proportions of Fe and Mn is used, materials similar to those of Examples 1 and 2 obtained using a system having a Fe/Mn ratio of 0.5/0.5 can be obtained. On the other hand, P2-structure single-phase materials could not be obtained by calcinating Na$_{0.67}$Fe$_{0.67}$Mn$_{0.33}$O$_2$ and Na$_{0.67}$Fe$_{0.75}$Mn$_{0.25}$O$_2$. Instead, the formation of the O3 structure was observed. In addition, the following reduction treatment could not be performed. These results revealed that the Fe proportion in a composition containing Fe and Mn is desirably 0.5 or less.

INDUSTRIAL APPLICABILITY

The composite metal oxide of the present invention contributes to increasing the capacities of sodium secondary batteries when it is used as a positive electrode material for such high-capacity sodium secondary batteries. The sodium secondary battery of the present invention can be suitably used as: a power source for mobile electronic devices, etc.; an electricity storage device used in combination with electric power generators for thermal power generation, wind power generation, fuel cell power generation, etc. to stabilize electric power supply; a power source for emergency electricity storage systems for ordinary houses and apartments and night-time electricity storage systems; an uninterruptible power supply; a power source for transportation systems such as electric vehicles, hybrid electric vehicles, and plug-in hybrid electric vehicles.

The invention claimed is:

1. A composite metal oxide having a composition represented by the general formula Na$_x$Me$_y$O$_2$, where Me is at least one selected from the group consisting of Fe, Mn, and Ni, x satisfies 0.8<x≤1.0, and y satisfies 0.95≤y<1.05, the composite metal oxide consisting of a P2 structure.

2. The composite metal oxide according to claim 1, wherein the Me has a composition represented by the general formula Fe$_a$Mn$_b$, where a and b satisfy 0<a≤0.5 and 0.95≤a+b<1.05.

3. The composite metal oxide according to claim 1, wherein the x is 1.0.

4. A sodium secondary battery comprising:
a positive electrode comprising a composite metal oxide having a composition represented by the general formula Na$_x$Me$_y$O$_2$, where Me is at least one selected from the group consisting of Fe, Mn, and Ni, x satisfies 0.8<x≤1.0, and y satisfies 0.95≤y<1.05, the composite metal oxide consisting of a P2 structure;
a negative electrode comprising a material capable of absorbing and desorbing Na ions; and
an electrolyte comprising Na ions and anions.

* * * * *